US012410724B1

(12) United States Patent
Kumar et al.

(10) Patent No.: US 12,410,724 B1
(45) Date of Patent: Sep. 9, 2025

(54) GAS TURBINE ENGINE WITH INERTIALLY DAMPED SEALS

(71) Applicant: General Electric Company, Cincinnati, OH (US)

(72) Inventors: Uttara Vijay Kumar, Rexford, NY (US); Deepak Trivedi, Halfmoon, NY (US); Rahul Anil Bidkar, Clifton Park, NY (US); Steven Douglas Johnson, Milford, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/789,987

(22) Filed: Jul. 31, 2024

(51) Int. Cl.
*F01D 11/02* (2006.01)
*F01D 25/04* (2006.01)

(52) U.S. Cl.
CPC ............ *F01D 11/025* (2013.01); *F01D 25/04* (2013.01); *F05D 2240/55* (2013.01); *F05D 2260/96* (2013.01)

(58) Field of Classification Search
CPC .... F01D 11/025; F01D 25/04; F05D 2240/55; F05D 2260/96
See application file for complete search history.

(56) References Cited

U.S. PATENT DOCUMENTS

| | | | | |
|---|---|---|---|---|
| 2,912,223 | A | 11/1959 | Hull, Jr. | |
| 4,983,051 | A * | 1/1991 | Hibner | F01D 25/164 384/399 |
| 5,110,257 | A * | 5/1992 | Hibner | F16C 27/045 415/119 |
| 5,169,159 | A * | 12/1992 | Pope | F16J 15/441 277/422 |
| 5,509,664 | A | 4/1996 | Borkiewicz | |
| 6,692,006 | B2 | 2/2004 | Holder | |
| 8,474,827 | B2 | 7/2013 | Grondahl et al. | |
| 9,359,908 | B2 | 6/2016 | Bidkar et al. | |
| 9,581,036 | B2 | 2/2017 | Pal et al. | |
| 9,988,921 | B2 | 6/2018 | Wilson et al. | |
| 10,190,431 | B2 | 1/2019 | Bidkar et al. | |
| 10,352,194 | B2 | 7/2019 | Varney et al. | |
| 10,370,991 | B2 | 8/2019 | Wilson et al. | |
| 11,035,253 | B2 | 6/2021 | Walker | |
| 2012/0248704 | A1 | 10/2012 | Fennell et al. | |
| 2020/0184159 | A1* | 6/2020 | Handshaw | G06K 7/109 |
| 2023/0106380 | A1* | 4/2023 | Bidkar | F01D 11/025 415/173.2 |
| 2023/0407762 | A1 | 12/2023 | Hopper et al. | |

* cited by examiner

*Primary Examiner* — Hoang M Nguyen
(74) *Attorney, Agent, or Firm* — Dority & Manning, P.A.

(57) ABSTRACT

A gas turbine engine includes a compressor section and a turbine section in axial flow arrangement defining an axially extending, longitudinal centerline, and arranged as a rotor and a stator. A floating seal assembly is disposed at an interface of the rotor and the stator to seals at least portions of the rotor and the stator relative to each other. The floating seal assembly includes one or more inertial damping elements tuned to one or more frequencies.

17 Claims, 9 Drawing Sheets

GAS TURBINE ENGINE WITH INERTIALLY DAMPED SEALS

FIELD

The present disclosure relates to a gas turbine engine, and more specifically, to a gas turbine engine incorporating seals.

BACKGROUND

Turbine engines, and particularly gas turbine engines, are rotary engines that extract energy from a flow of working air passing serially through a compressor section, a combustor section, and a turbine section. The compressor and turbine stages comprise axially arranged pairs of rotating blades and stationary vanes. The compressor section, the combustor section, and the turbine section may be disposed in an axial flow arrangement and define at least one rotating element or rotor and at least one stationary component or stator. A seal assembly can be located between the stator and the rotor and be used to reduce leakage fluids between the rotor and stator.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
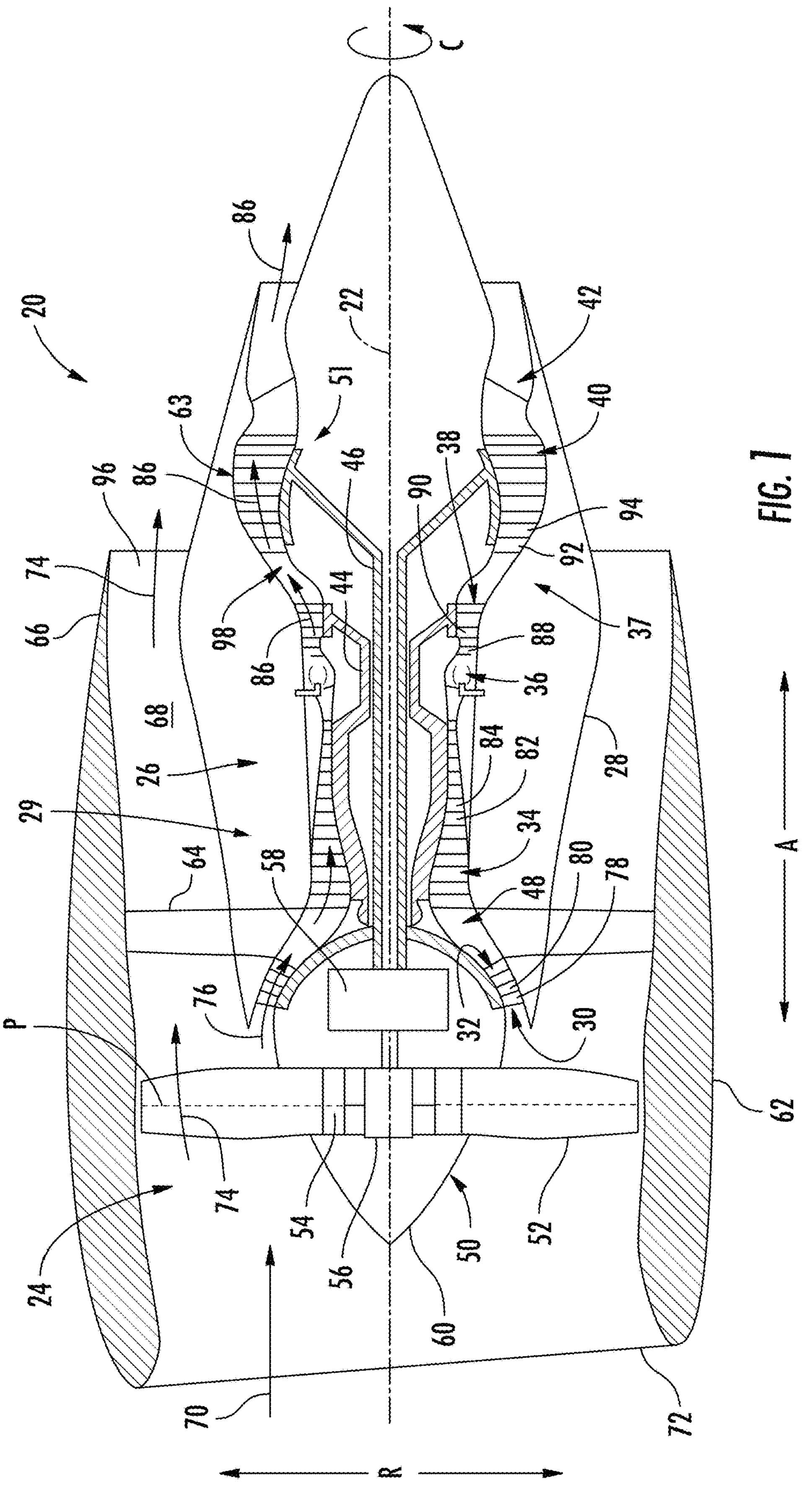
FIG. 1 is a cross-sectional view of an exemplary gas turbine engine in accordance with an exemplary aspect of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The term "turbomachine" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, and/or precursors for ultra-high-temperature ceramics, such as polymeric precursors. Each successive layer may be, for example, between about 10 μm and about 200 μm, although the thickness may be determined based on any number of parameters and may be any suitable size.

As used herein, the term "build plane" refers to a plane defined by a surface upon which an energy beam impinges to selectively irradiate and thereby consolidate powder material during an additive manufacturing process. Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

As used herein, the term "consolidate" or "consolidating" refers to solidification of powder material as a result of irradiating the powder material, including by way of melting, fusing, sintering, or the like.

The present disclosure is generally related to an inertially damped floating seal assembly. The floating seal assembly includes one or more inertial damping elements tuned to or activated at certain frequencies to counter the resonant vibration modes of the floating seal assembly while maintaining the primary function of the floating seal assembly of tracking rotor motions at a close gap. As used herein, "damped" or "damping" shall refer to the attenuation of mechanical excitation. In exemplary embodiments, one or more portions of the inertial damping elements are integrated with fluid columns of a viscous fluid such that the fluid moves out-of-phase to motion of the floating seal assembly and dampens the mode of vibration. Additionally or alternatively, the inertial damping elements may be coupled via springs to the floating seal assembly tuned in axial, radial, and/or circumferential directions based on eigenfrequencies of the floating seal assembly. Additionally or alternatively, the floating seal assembly may include one or more interior areas, such as cavities or pockets, such that the inertial damping elements include frictional dampening elements disposed within the interior areas of the floating seal assembly to impart particle damping to various modes of vibration.

Embodiments of the present disclosure provide intrinsic damping without interaction with adjacent structure such as, by way of non-limiting example, contact or rubbing, and without disturbing rotor tracking. Embodiments of the present disclosure provide damping in specific directions without affecting rotor tracking. Embodiments of the present disclosure further enable tighter running clearances and reduced leakage. Generally, in floating seal applications, a minimum gap or clearance is maintained between a rotor-to-stator interface. Because of side-to-side, tilting, and/or rocking of conventional floating seal assemblies, the minimum gap is defined to accommodate the side-to-side, tilting, and/or rocking of conventional floating seal assemblies. Embodiments of the present disclosure dampen such side-to-side, tilting, and/or rocking of the floating seal assembly enabling a decrease in the minimum running clearance between the rotor and the stator.

Referring now to the drawings, FIG. 1 is a cross-sectional side view of a gas turbine engine 20 in accordance with an exemplary embodiment of the present disclosure. More particularly, for the embodiment of FIG. 1, the gas turbine engine 20 is a multi-spool, high-bypass turbofan jet engine, sometimes also referred to as a "turbofan engine." As shown in FIG. 1, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an outer casing 28 that defines an annular core inlet 30. The outer casing 28 at least partially encases, in serial flow relationship, an axial compressor section 29 including a booster or low-pressure (LP) compressor 32 and a high-pressure (HP) compressor 34, a combustion section 36, a turbine section 37 including a high-pressure (HP) turbine 38 and a low-pressure (LP) turbine 40, and a jet exhaust nozzle 42.

A high-pressure (HP) shaft 44 drivingly connects the HP turbine 38 to the HP compressor 34. A low-pressure (LP) shaft 46 that drivingly connects the LP turbine 40 to the LP compressor 32. The LP compressor 32, the HP compressor 34, the combustion section 36, the HP turbine 38, the LP turbine 40, and the jet exhaust nozzle 42 together define a core air flowpath 48 through the gas turbine engine 20. The LP shaft 46 and the HP shaft 44 are rotatable about the longitudinal centerline 22 and couple to a set of rotatable elements, which can collectively define a rotor 51.

For the embodiment depicted, the fan section 24 includes a fan 50 having a plurality of fan blades 52 coupled to a disk 54 in a spaced apart manner. As depicted, the fan blades 52 extend outwardly from disk 54 generally along the radial direction R. Each fan blade 52 is rotatable with the disk 54 about a pitch axis P by virtue of the fan blades 52 being operatively coupled to a suitable pitch change mechanism 56 configured to collectively vary the pitch of the fan blades 52, e.g., in unison.

The gas turbine engine 20 further includes a power gear box 58. The fan blades 52, disk 54, and pitch change mechanism 56 are together rotatable about the longitudinal centerline 22 by the LP shaft 46 across the power gear box 58. The power gear box 58 includes a plurality of gears for adjusting a rotational speed of the fan 50 relative to a rotational speed of the LP shaft 46, such that the fan 50 and the LP shaft 46 may rotate at more efficient relative speeds.

Referring still to the exemplary embodiment of FIG. 1, the disk 54 is covered by rotatable front hub 60 of the fan section 24 (sometimes also referred to as a "spinner"). The front hub 60 is aerodynamically contoured to promote an airflow through the plurality of fan blades 52. Additionally, the exemplary fan section 24 includes an annular fan casing or outer nacelle 62 that circumferentially surrounds the fan 50 and/or at least a portion of the turbomachine 26. The outer nacelle 62 is supported relative to the turbomachine 26 by a plurality of circumferentially spaced struts or outlet guide vanes 64 in the embodiment depicted. Moreover, a downstream section 66 of the outer nacelle 62 extends over an outer portion of the turbomachine 26 to define a bypass airflow passage 68 therebetween.

It should be appreciated, however, that the exemplary gas turbine engine 20 depicted in FIG. 1 is provided by way of example only, and that in other exemplary embodiments, the gas turbine engine 20 may have other configurations. Additionally, or alternatively, although the gas turbine engine 20 depicted is configured as a geared gas turbine engine (e.g., including the power gear box 58) and a variable pitch gas turbine engine (e.g., including a fan 50 configured as a variable pitch fan), in other embodiments, the gas turbine engine 20 may be configured as a direct drive gas turbine engine (such that the LP shaft 46 rotates at the same speed as the fan 50), as a fixed pitch gas turbine engine (such that the fan 50 includes fan blades 52 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the outer nacelle 62 and fan section 24. As the volume of air 70 passes across the fan blades 52, a first portion of air 74 is directed or routed into the bypass airflow passage 68 and a second portion of air 76 is directed or routed into the core air flowpath 48, or more specifically into the LP compressor 32. The ratio between the first portion of air 74 and the second portion of air 76 is commonly known as a bypass ratio.

As the second portion of air 76 enters the LP compressor 32, one or more sequential stages of low-pressure (LP) compressor stator vanes 78 and low-pressure (LP) compressor rotor blades 80 coupled to the LP shaft 46 progressively compress the second portion of air 76 flowing through the LP compressor 32 towards the HP compressor 34. Next, one or more sequential stages of high-pressure (HP) compressor stator vanes 82 and high-pressure (HP) compressor rotor blades 84 coupled to the HP shaft 44 further compress the second portion of air 76 flowing through the HP compressor 34. This provides compressed air to the combustion section 36 where it mixes with fuel and burns to provide combustion gases 86.

The combustion gases 86 are routed through the HP turbine 38 where a portion of thermal and/or kinetic energy from the combustion gases 86 is extracted via sequential stages of high-pressure (HP) turbine stator vanes 88 that are coupled to a turbine casing and high-pressure (HP) turbine rotor blades 90 that are coupled to the HP shaft 44, thus causing the HP shaft 44 to rotate, thereby supporting operation of the HP compressor 34. The combustion gases 86 are then routed through the LP turbine 40 where a second portion of thermal and kinetic energy is extracted from the combustion gases 86 via sequential stages of low-pressure (LP) turbine stator vanes 92 that are coupled to a turbine casing and low-pressure (LP) turbine rotor blades 94 that are coupled to the LP shaft 46, thus causing the LP shaft 46 to rotate, and thereby supporting operation of the LP compressor 32 and/or rotation of the fan 50. Complementary to the rotor 51, the stationary portions of the gas turbine engine 20, such as the LP compressor stator vanes 78, the HP compressor stator vanes 82, the HP turbine stator vanes 88, and the LP turbine stator vanes 92, are also referred to individually or collectively as a stator 63. As such, the stator 63 can refer to the combination of non-rotating components throughout the gas turbine engine 20.

The combustion gases 86 are subsequently routed through the jet exhaust nozzle 42 of the turbomachine 26 to provide propulsive thrust. Simultaneously, the pressure of the first portion of air 74 is substantially increased as it is routed through the bypass airflow passage 68 before it is exhausted from a fan nozzle exhaust section 96 of the gas turbine engine 20, also providing propulsive thrust. The HP turbine 38, the LP turbine 40, and the jet exhaust nozzle 42 at least partially define a hot gas path 98 for routing the combustion gases 86 through the turbomachine 26.

Figure 2:
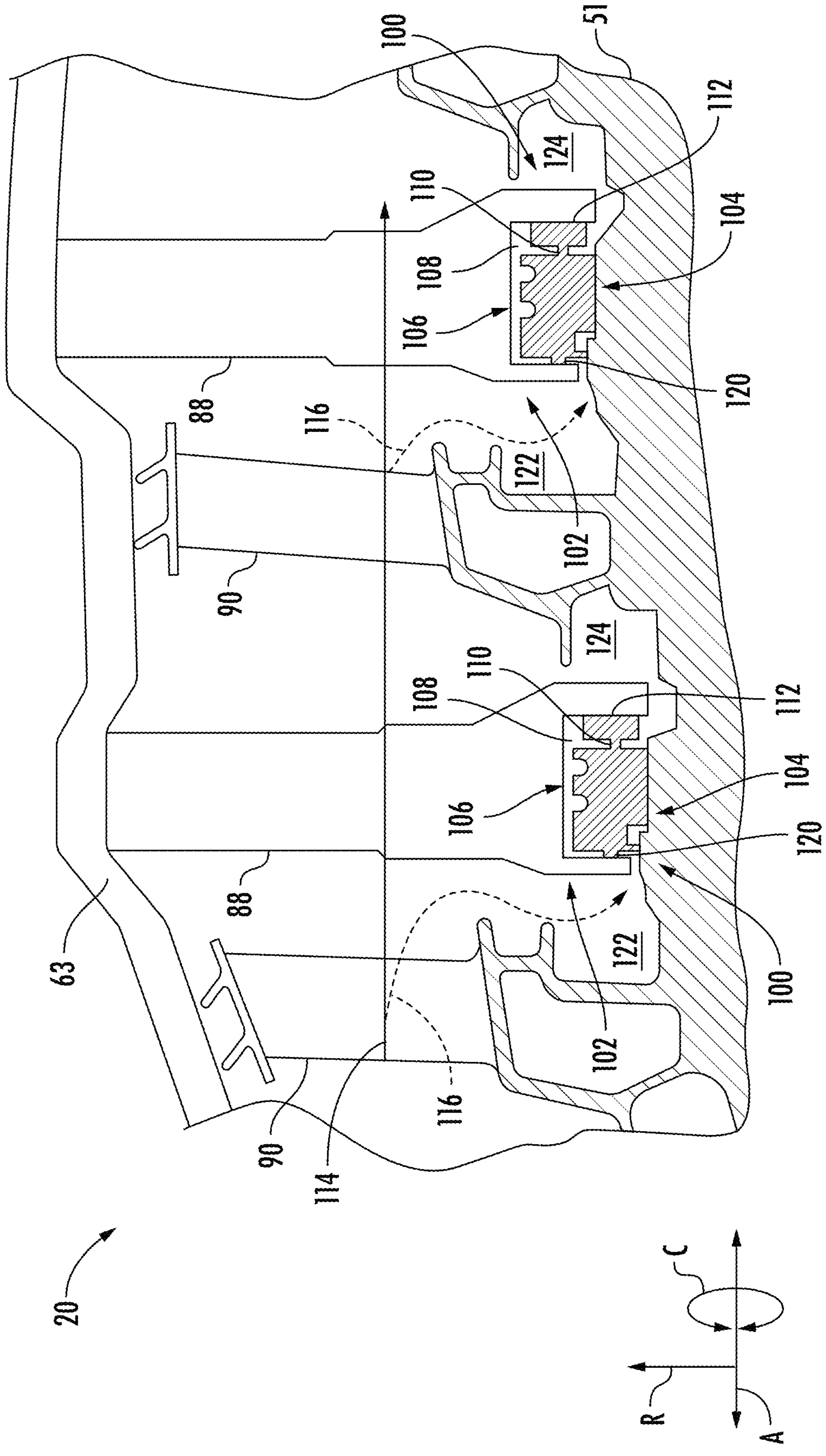
FIG. 2 is an enlarged cross-sectional view of a portion of a high-pressure compressor of the gas turbine engine as shown in FIG. 1, in accordance with an exemplary aspect of the present disclosure.

FIG. 2 further illustrates the rotor 51, the stator 63, and a floating seal assembly 100 disposed or positioned at an interface of the rotor 51 and the stator 63 for the gas turbine engine 20 of FIG. 1. In the example shown, at least a portion of the floating seal assembly 100 can be provided in the HP turbine 38 (FIG. 1) and depend from a portion of the stator 63, specifically from the HP turbine stator vanes 88 that extend from the outer portions of the stator 63 and located between two adjacent HP turbine rotor blades 90. In the illustrated embodiment, the floating seal assembly 100 is a floating radial seal assembly. It will be appreciated, however, that the floating seal assembly 100 can be positioned between or at an interface of any suitable rotating and stationary component of the gas turbine engine 20 within any portion of the gas turbine engine 20 such as, for example, in the fan section 24, the compressor section (e.g., the LP compressor 32 and/or the HP compressor 34), or the turbine section (e.g., the HP turbine 38 and/or the LP turbine 40) (FIG. 1). As such, the floating seal assembly 100 can be positioned with respect to any suitable stationary component such as, but not limited to, the LP compressor stator vanes 78, the HP compressor stator vanes 82, the HP turbine stator vanes 88, or the LP turbine stator vanes 92. For purposes of this disclosure, the HP turbine stator vane 88, or any other vane (e.g., the LP compressor stator vanes 78, the HP compressor stator vanes 82, or the LP turbine stator vanes 92), which depends form the stator 63 can be collectively referred to as the stator 63.

The floating seal assembly 100 can include a carriage assembly 102 carried by the stator 63 and having a seal seat 106 defining a seal cavity 108. The floating seal assembly 100 can further include a seal body 104 at least partially located within the seal cavity 108. One or more seal faces 112 and a pivot connection 110 can be provided between the seal body 104 and the carriage assembly 102. A seal 120 can be provided between the seal body 104 and the carriage assembly 102. The seal 120 can be configured to limit, restrict or otherwise stop the ingress of fluid between a portion of the seal body 104 and the carriage assembly 102 and into the seal cavity 108.

During operation of the gas turbine engine 20, a working fluid 114 can flow over the HP turbine rotor blades 90 and the HP turbine stator vanes 88. In the specific example, the working fluid 114 can be defined by the second portion of air 76 (FIG. 1), however, it will be appreciated that the working fluid 114 can be any suitable working fluid or airflow such as, but not limited to, the second portion of air 76 (FIG. 1), combustion gases, an ambient airflow, any combination thereof, or any other suitable fluid as described herein. The majority of the working fluid 114 can flow over the HP turbine rotor blades 90 and the HP turbine stator vanes 88 to define the core air flowpath 48 (FIG. 1). A leakage fluid 116 diverges from the working fluid 114 and enters the space between the HP compressor rotor blade 84 and the HP compressor stator vane 82 (FIG. 1) and flows between a radially inner portion of the stator 63 (e.g., the radially inner portions of the HP turbine stator vanes 88) and the rotor 51. Further yet, specific portions of the gas turbine engine 20 can be defined by various pressure differentials. As a non-limiting example, one side of the floating seal assembly 100 (e.g., in this case, axially forward or upstream of the floating seal assembly 100) can be defined by a pressure 122 while other portions (e.g., in this case, axially aft or downstream of the floating seal assembly 100) can be defined by a pressure 124. The pressure 122 can be higher than the pressure 124, thus defining the pressure differential across the floating seal assembly 100.

The floating seal assembly 100 can reduce or otherwise eliminate the amount of leakage fluid 116 that flows from an upstream portion of the HP turbine stator vane 88 exposed to the pressure 122 to a downstream portion of the HP turbine stator vane 88 exposed to the pressure 124. This is completed via a labyrinth between the stator 63 and the rotor 51. In other words, the floating seal assembly 100 can create a torturous path for the leakage fluid 116, thus either reducing or eliminating the amount of leakage fluid 116 that is able to flow around the radially inner portion of the stator 63. The seal body 104 can be free to move in the radial direction within the seal cavity 108. The seal body 104 can further include aerodynamic lift-generation features (not illustrated) such as, but not limited to, a spiral groove, a Rayleigh pad, or otherwise include a curvature mismatch between the seal body 104 and a radius of the rotor 51. The aerodynamic lift-generation features can generate a film of fluid between the seal body 104 and the rotor 51. The film of fluid can generate a lift force between the rotor 51 and the seal body 104 such that seal body 104 can float on the rotor 51 without rubbing, touching, or otherwise contacting the rotor 51.

Figure 3B:
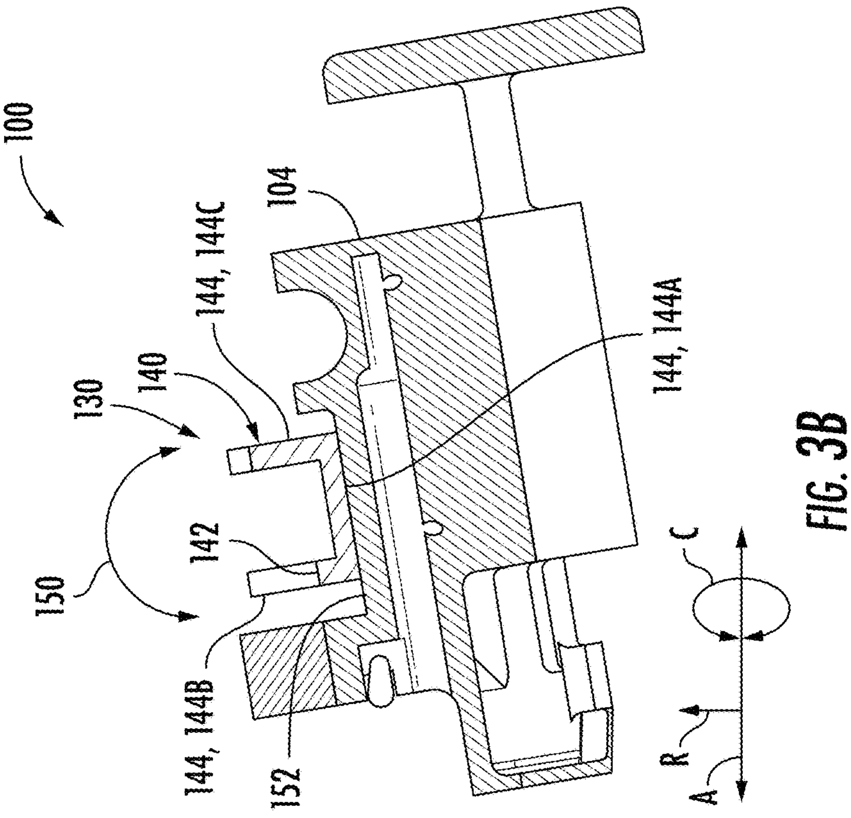
FIG. 3B is schematic perspective diagram of the floating seal assembly of FIG. 3A in a partially rotated orientation in accordance with an exemplary aspect of the present disclosure.
Figure 3A:
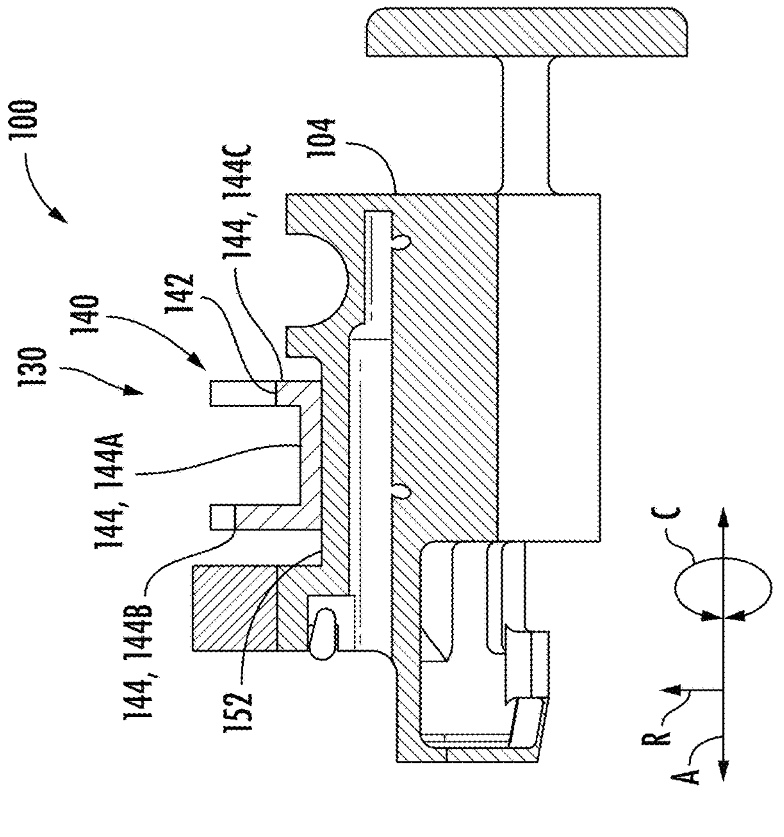
FIG. 3A is schematic perspective diagram of a floating seal assembly in accordance with an exemplary aspect of the present disclosure.

FIGS. 3A and 3B are schematic perspective diagrams of the floating seal assembly 100 according to aspects of the present disclosure. In the illustrated embodiment, the floating seal assembly 100 includes one or more inertial damping elements 130. Embodiments of the one or more inertial damping elements 130 provide tuned inertial damping that gets activated at certain frequencies to counter the resonant vibration modes of the floating seal assembly 100, while maintaining the primary function of the floating seal assembly 100 of tracking the rotor 51 motions at a close gap to the rotor 51. In exemplary embodiments, the one or more inertial damping elements 130 include one or more tubes 140 containing or integrated with a fluid 142. The fluid 142 may be a viscous fluid such as, by way of non-limiting example, a liquid such as a silicone damping fluid, such that the fluid 142 moves in out-of-phase motion with respect to the motion of the floating seal assembly 100 at a target frequency where damping is desired. In exemplary embodiments, the one or more tubes 140 are sized and/or oriented to enable damping in one or more of the axial direction A, the radial direction R, or the circumferential direction C. FIG. 3B depicts vibrational movement of the floating seal assembly 100 in the axial direction. However, it should be understood that the floating seal assembly 100 may also experience vibrational movement in the radial direction R or the circumferential direction C. Correspondingly, the one or more inertial damping elements 130 may be positioned or oriented to dampen vibrations axially, radially, and/or circumferentially.

In exemplary embodiments, the one or more tubes 140 may include one or more hollow, cylindrical tube segments 144. The one or more tube segments 144 are sized and/or oriented to enable damping in one or more of the axial direction A, the radial direction R, or the circumferential direction C. In exemplary embodiments, the one or more tubes 140 may be U-shaped geometrically having a single tube segment 144A extending between a pair of tube segments 144B, 144C where the tube segments 144B, 144C are positioned at opposite ends of the tube segment 144A and located at least partially perpendicular to the tube segment 144A. However, it should be understood that the one or more tubes 140 may be otherwise geometrically configured. The fluid 142 disposed within the tube 140 functions as a tuned damper corresponding to a particular frequency. In exemplary embodiments, one or more factors may be used to configure the inertial damping element 130 to dampen vibrations corresponding to a particular direction and frequency such as, by way of non-limiting example, the cross-sectional area of the tube segments 144, a density of the fluid 142, a height of a column of the fluid 142 (e.g., within the tube segments 144B, 144C), a width of a column of the fluid 142 (e.g., within the tube segment 144A), and the acceleration due to gravity. In exemplary embodiments, such as in aerospace applications where a vehicle such as, by way of non-limiting example, an aircraft having a gas turbine engine incorporating the floating seal assembly 100 according to aspects of the present disclosure, the acceleration due to gravity is impacted based at least based on different G values or loads experienced during different flight conditions based on vertical acceleration (e.g., take-off and landing versus cruise). Embodiments of the present disclosure configure the inertial damping element 130 to dampen vibrations corresponding to a particular direction and frequency based on or activated at different flight conditions or G loads that will be encountered by the floating seal assembly 100. Thus, in exemplary embodiments, different inertial damping elements 130 may be tuned to take into account different or respective G loads. As depicted in FIG. 3B, in response to a rocking or pitching movement of the floating seal assembly 100, indicated by the direction 150 in FIG. 3B, with respect to the axial direction A, the fluid 142 flows within the tube segments 144 out-of-phase with respect to a particular resonance frequency.

In the embodiment illustrated in FIGS. 3A and 3B, the one or more inertial damping element 130 are secured or coupled to an exterior or outwardly-facing surface of the seal body 104. In the illustrated embodiment, the one or more inertial damping elements 130 are secured or coupled to a radially outward surface 152 of the seal body 104 with respect to the rotor 51 (FIG. 2); however, it should be understood that the one or more inertial damping elements 130 may be otherwise positioned with respect to the seal body 104 or located elsewhere on the floating seal assembly 100. Although only a single inertial damping element 130 is depicted in FIGS. 3A and 3B, it should be understood that two or more inertial damping elements 130 may be positioned on the floating seal assembly 100 to dampen vibrations in other directions and at other resonant frequencies.

Figure 4B:
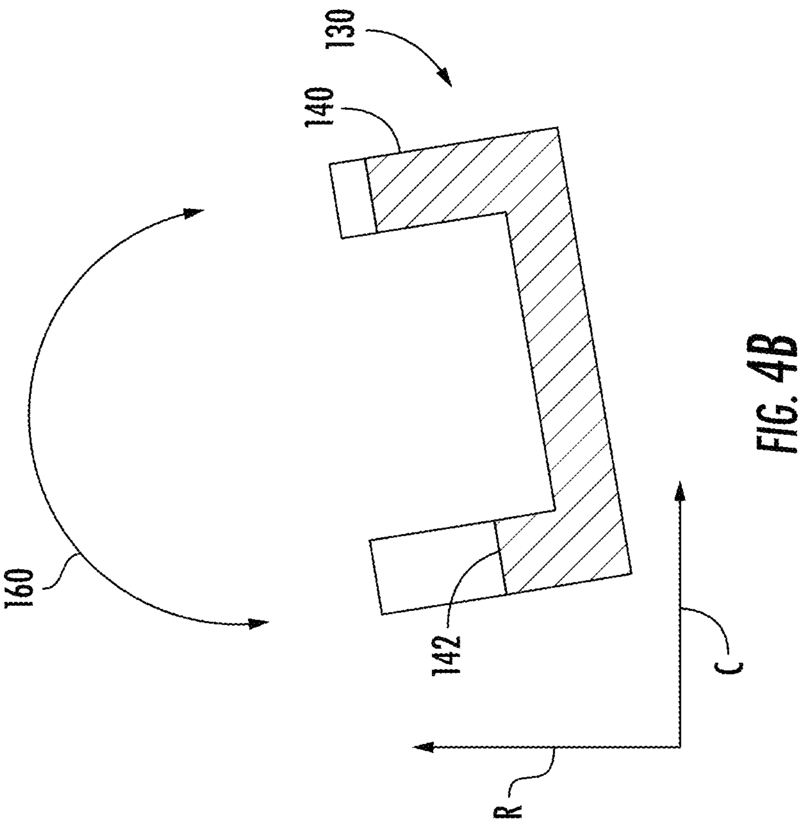
FIG. 4B is schematic perspective diagram of an inertial damping element of a floating seal assembly oriented in a circumferential direction in accordance with an exemplary aspect of the present disclosure.
Figure 4A:
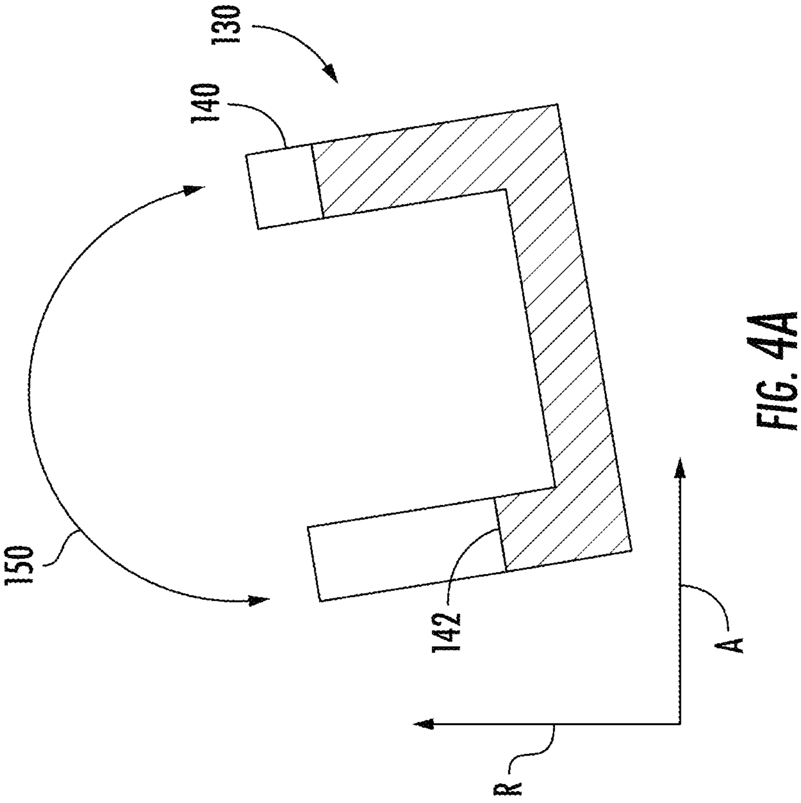
FIG. 4A is schematic perspective diagram of an inertial damping element of a floating seal assembly oriented in an axial direction in accordance with an exemplary aspect of the present disclosure.

FIGS. 4A and 4B depict exemplary positions and/or orientations of the inertial damping element 130 with respect to various directions. As depicted in FIG. 4A, the inertial damping element 130 is oriented with respect to the axial direction to dampen a rocking or pitching movement of the floating seal assembly 100, indicated by the direction 150, with respect to the axial direction A. As depicted in FIG. 4B, the inertial damping element 130 is oriented with respect to the circumferential direction to dampen a rocking or pitching movement of the floating seal assembly 100, indicated by the direction 160, with respect to the circumferential direction C. Thus, it should be understood that the one or more inertial damping elements 130 may be arranged in respective different orientations to dampen vibrations corresponding to different directions (e.g., pitching, rolling, or yawing) at particular frequencies.

Figure 5:
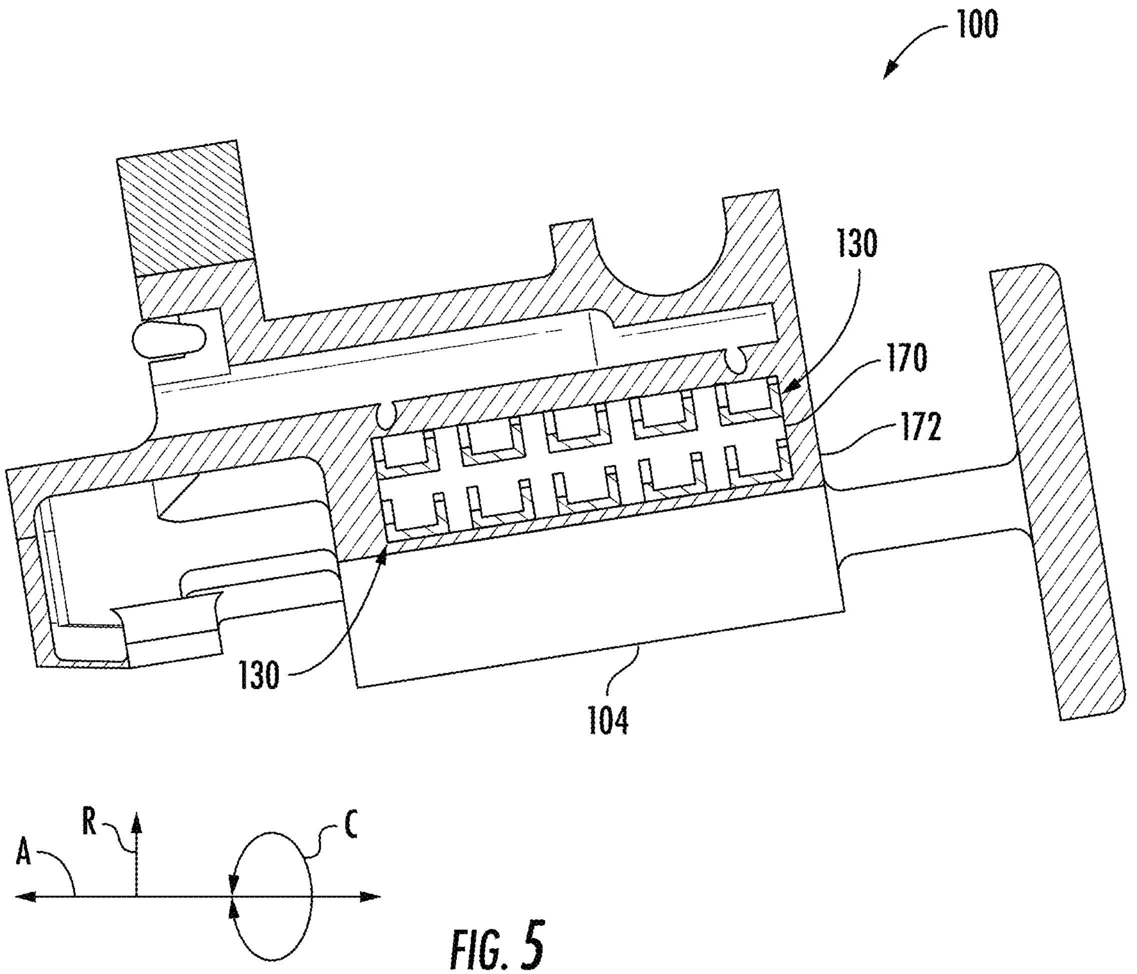
FIG. 5 is a schematic perspective diagram of a floating seal assembly in accordance with an exemplary aspect of the present disclosure.

FIG. 5 is a schematic perspective diagram of the floating seal assembly 100 according to aspects of the present disclosure. In the illustrated embodiment, the floating seal assembly 100 includes an interior area 170 formed within the seal body 104. The interior area 170 may be a cavity, closed or open, or other type of location disposed within exterior boundaries 172 of the seal body 104. In the illustrated embodiment, the one or more inertial damping elements 130 are disposed within the interior area 170. In the illustrated embodiment, the one or more inertial damping elements 130 are positioned to dampen vibrations in the axial direction A; however, it should be understood that the orientations of one or more of the inertial damping elements 130 may be varied to dampen vibrations on other directions, such as in the radial direction R and the circumferential direction C. It should also be understood that the floating seal assembly 100 may include a combination of exterior-disposed and interior-disposed inertial damping elements 130 with respect to the seal body 104.

Figure 6A:
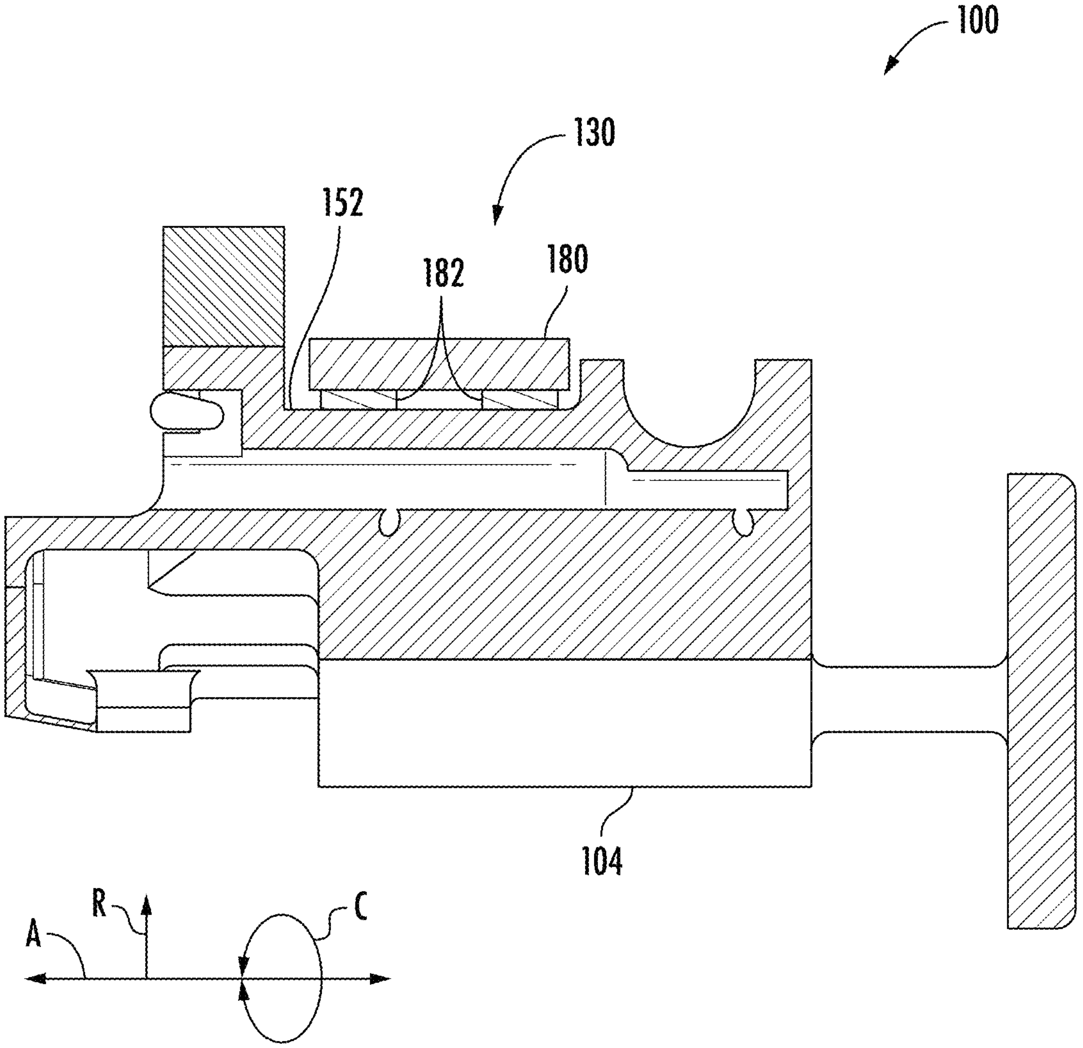
FIG. 6A is schematic perspective diagram of a floating seal assembly in accordance with an exemplary aspect of the present disclosure.
Figure 6B:
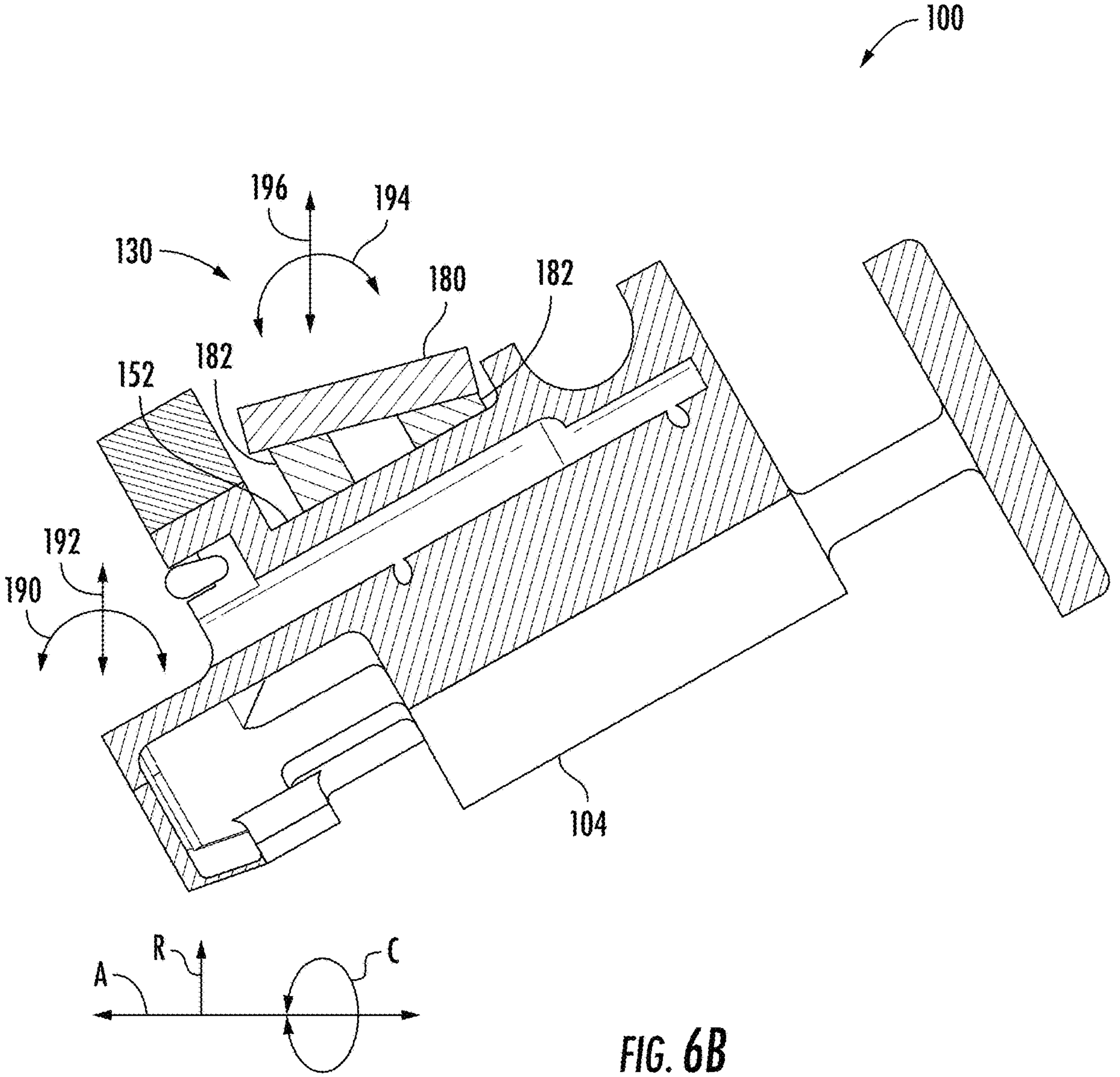
FIG. 6B is schematic perspective diagram of the floating seal assembly of FIG. 6A in a partially rotated orientation in accordance with an exemplary aspect of the present disclosure.

FIGS. 6A and 6B are schematic perspective diagrams of the floating seal assembly 100 according to aspects of the present disclosure. In the illustrated embodiment, the floating seal assembly 100 includes the one or more inertial damping elements 130. In the illustrated embodiment, the one or more inertial damping elements 130 are formed as rigid, solid, or non-fluid dampening elements, instead of as fluid-based damping elements as depicted and described in connection with FIGS. 3A, 3B, 4A, and 4B. In FIGS. 6A and 6B, the one or more inertial damping elements 130 include one or more mass elements 180 coupled to the seal body 104 via one or more compliance elements 182. The one or more compliance elements 182 are tuned in one or more of the axial direction A, the radial direction R, or the circumferential direction C. The one or more compliance elements 182 may be any type of elastic device that provide a desired amount of compliance (e.g., expansion and compression) such that the compliance element 182 returns to its original shape or position after being extended or distorted such as, by way of non-limiting example, any type of spring (e.g., leaf springs, helical springs, etc.) or flexures created in-place using wire electrical discharge machining (EDM) techniques. In exemplary embodiments, the one or more mass elements 180 function as a damper by going out-of-phase with the motion of the seal body 104 at certain specific frequencies. In the illustrated embodiment, a single mass element 180 is depicted oriented along the axial direction A and coupled to the seal body 104 via two compliance elements 182; however, similar to as described in connection with FIGS. 3A, 3B, 4A, and 4B, the one or more mass elements 180 may be oriented in other directions, and additional or fewer compliance elements 182 having the same or different stiffness levels may be used to couple the mass element 180 to the seal body 104. As depicted in FIG. 6B, the seal body 104 may experience a rocking vibrational movement along the axial direction A, indicated by the direction 190 and may experience rocking movement in the radial direction R, indicated by the direction 192. The mass element 180, via the compliance elements 182, moves out-of-phase with the motion of the seal body 104 in the axial direction A, indicated by the direction 194, and the radial direction R, indicated by the direction 196. In the illustrated embodiment, the one or more mass elements 180 are coupled to the surface 152 of the seal body 104 via the one or more compliance elements 182; however, it should be understood that the one or more mass element 180 may be coupled by the one or more compliance elements 182 to other locations of the seal body 104. Additionally, in the illustrated embodiment, the one or more mass elements 180 are coupled to an exterior surface of the seal body 104; however, similar to as depicted in FIG. 5, the one or more mass elements 180 and corresponding compliance elements 182 may be coupled to an interior area of the seal body 104, such as the interior area 170 (FIG. 5). Additionally, the floating seal assembly 100 may include a combination of interior-disposed and exterior-disposed mass elements 180 and corresponding compliance elements 182.

Figure 7:
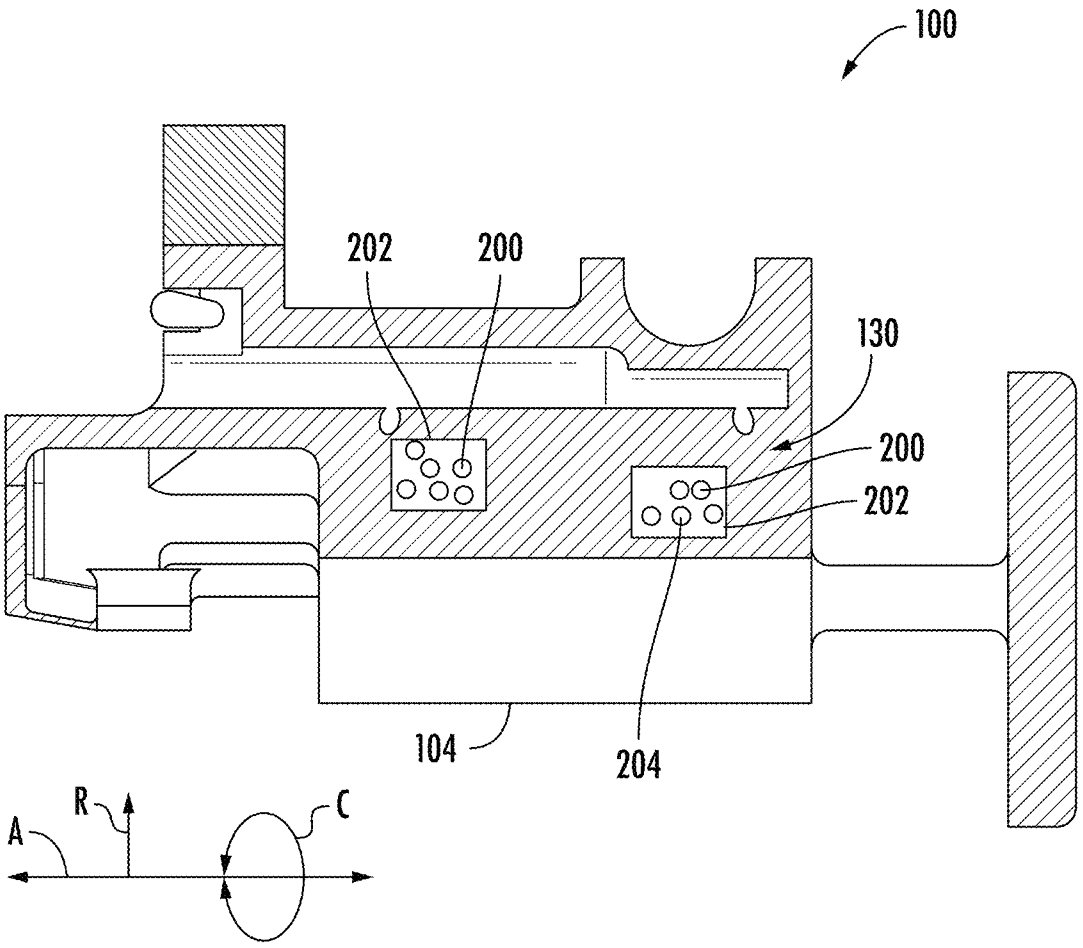
FIG. 7 is schematic perspective diagram of a floating seal assembly in accordance with an exemplary aspect of the present disclosure.

FIG. 7 is a schematic perspective diagram of the floating seal assembly 100 according to aspects of the present disclosure. In the illustrated embodiment, the floating seal assembly 100 includes the one or more inertial damping elements 130. In the embodiment illustrated in FIG. 7, the one or more inertial damping elements 130 include frictional damping elements 200 disposed within one or more interior areas 202 of the seal body 104. The interior area 202 may be a closed cavity disposed within the exterior boundaries of the seal body 104. In exemplary embodiments, the one or more interior areas 202 can be placed at different locations within the seal body 104 and may be configured with varying geometries to provide vibration dampening in one or more of the axial direction A, the radial direction R, and the circumferential direction C. In exemplary embodiments, the frictional damping elements 200 include a plurality of loose objects that absorb energy via frictional dissipation. The frictional damping elements 200 may include any type of loose materials such as, by way of non-limiting example, granular materials. In exemplary embodiments, the seal body 104 may be additively manufactured. In such exemplary embodiments, the frictional damping elements 200 may be unconsolidated powder 204. In such an exemplary embodiment, the seal body 104 may be formed by additive manufacturing processes such that the powder 204 is consolidated in regions of the seal body 104 surrounding the interior areas 202 to form the interior areas 202. Portions of the powder 204 may be applied during the additive manufacturing process in the regions of the interior areas 202 but not consolidated such that the powder 204 remains in a loose or unconsolidated state within the interior areas 202. Accordingly, the unconsolidated powder 204 absorbs energy via frictional dissipation within the interior areas 202.

Figure 8:
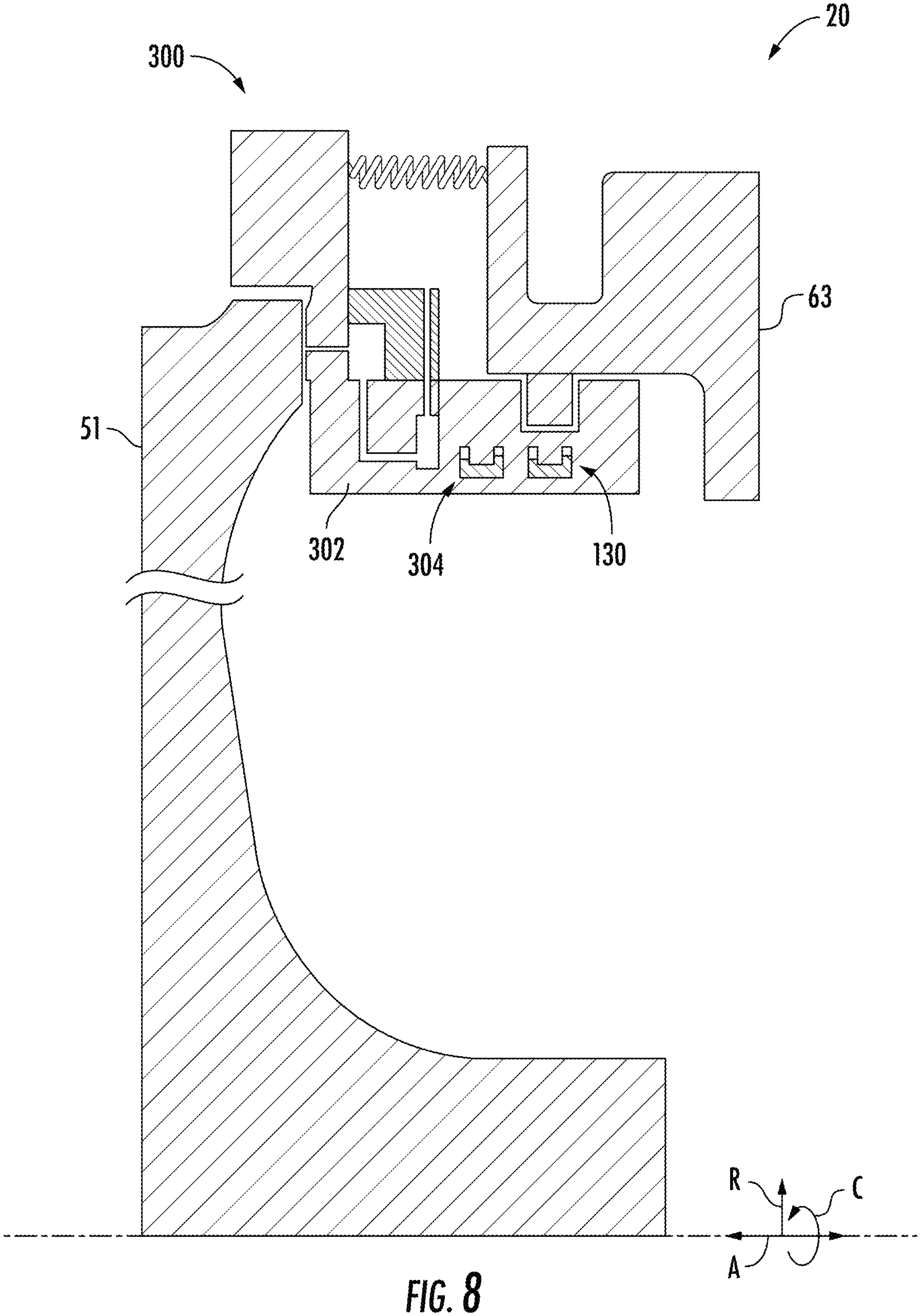
FIG. 8 is an enlarged cross-sectional view of a portion of a gas turbine engine as shown in FIG. 1, in accordance with an exemplary aspect of the present disclosure.

As described above, the floating seal assembly 100 (FIGS. 3A-7) with one or more inertial damping elements 130 (FIGS. 3A-7) can be positioned between any suitable rotating and stationary component of the gas turbine engine 20 (FIG. 1) within any portion of the gas turbine engine 20 (FIG. 1). FIG. 8 further illustrates a floating seal assembly 300 configured as a floating face seal assembly. The floating seal assembly 300 may be configured similar to the floating seal assembly 100 (FIGS. 3A-7) including one or more of the inertial damping elements 130 as described and depicted in connection with FIGS. 3A-7. It should be understood that the floating seal assembly 300 may have another shape or appearance from what is shown. The stator 63 may be a casing of the turbomachine 26 (FIG. 1) and the rotor 51 may be a shaft of the turbomachine 26 (FIG. 1). The floating seal assembly 300 is disposed between the stator 63 and the rotor 51.

In the example shown, the floating seal assembly 300 includes a seal body 302. Similar to as described above in connection with the floating seal assembly 100 ((FIGS. 3A-7), the one or more inertial damping elements 130 may be located and/or coupled to an exterior surface of the seal body 302, disposed within an interior area 304 of the of the seal body 302, or any combination thereof.

Thus, embodiments of the present disclosure provide a floating seal assembly having one or more inertial damping elements tuned to or activated at certain frequencies to counter the resonant vibration modes of the floating seal assembly while maintaining the primary function of the floating seal assembly of tracking rotor motions at a close gap. Embodiments of the present disclosure provide intrinsic damping without interaction with adjacent structure such as, by way of non-limiting example, contact or rubbing, and without disturbing rotor tracking. Embodiments of the present disclosure provide damping to accommodate the side-to-side, tilting, and/or rocking of conventional floating seal assemblies and enable a decrease in the minimum running clearance between the rotor and the stator. Embodiments of a floating seal assembly according to the present disclosure may include multiple inertial damping elements each configured to address different resonant frequencies and different accelerations due to different G values experienced be a vehicle incorporating the floating seal assembly.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a compressor section and a turbine section in axial flow arrangement defining an axially extending, longitudinal centerline, and arranged as a rotor and a stator; and a floating seal assembly disposed at an interface of the rotor and the stator, the floating seal assembly comprising one or more inertial damping elements, the one or more inertial damping elements tuned to one or more frequencies.

The gas turbine engine of the preceding clause, wherein at least one inertial damping element of the one or more inertial damping elements comprises a fluid.

The gas turbine engine of any preceding clause, wherein at least one inertial damping element of the one or more inertial damping elements comprises: one or more tubes; and a fluid disposed within the one or more tubes.

The gas turbine engine of any preceding clause, wherein one or more tubes are U-shaped.

The gas turbine engine of any preceding clause, wherein the floating seal assembly comprises a seal body, and wherein at least one inertial damping element of the one or more inertial damping elements is positioned within an interior area of the seal body.

The turbine engine of any preceding clause, wherein the floating seal assembly comprises a seal body, and wherein at least one inertial damping element of the one or more inertial damping elements is coupled to an exterior surface of the seal body.

The turbine engine of any preceding clause, wherein the floating seal assembly comprises a seal body, and wherein a first inertial damping element of the one or more inertial damping elements is coupled to an exterior surface of the seal body and a second inertial damping element of the one or more inertial damping elements is disposed within an interior area of the seal body.

The gas turbine engine of any preceding clause, wherein at least one inertial damping element of the one or more inertial damping elements comprises one or more tubes oriented in at least one of an axial direction, a radial direction, or a circumferential direction.

The gas turbine engine of any preceding clause, wherein the floating seal assembly comprises a seal body, and wherein at least one inertial damping element of the one or more inertial damping elements comprises: one or more mass elements; and one or more compliance elements coupling the one or more mass elements to the seal body.

The gas turbine engine of any preceding clause, wherein the floating seal assembly comprises a seal body having one or more interior areas, and wherein at least one inertial damping element of the one or more inertial damping elements comprise one or more frictional dampening elements disposed within the one or more interior areas.

The gas turbine engine of any preceding clause, wherein the one or more frictional dampening elements comprise unconsolidated powder.

The gas turbine engine of any preceding clause, wherein the floating seal assembly comprises a seal body formed with one or more interior areas defined during an additive manufacturing process, and wherein at least one interior area of the one or more interiors areas includes unconsolidated powder from the additive manufacturing process.

The gas turbine engine of any preceding clause, wherein the floating seal assembly comprises at least one of a floating radial seal assembly or a floating face seal assembly.

The gas turbine engine of any preceding clause, wherein at least one inertial damping element of the one or more inertial damping elements comprises at least one fluid-filled U-shaped tube.

The gas turbine engine of any preceding clause, wherein the one or more inertial damping elements comprises a first inertial damping element tuned to a first frequency and a second inertial damping element tuned to a second frequency, the second frequency different than the first frequency.

The gas turbine engine of any preceding clause, wherein at least one inertial damping element of the first and second inertial damping elements contains a fluid.

The gas turbine engine of any preceding clause, wherein the floating seal assembly comprises a seal body, and wherein at least one inertial damping element of the first and second inertial damping elements comprises: one or more mass elements; and one or more compliance elements coupling the one or more mass elements to the seal body.

The gas turbine engine of any preceding clause, wherein the floating seal assembly comprises a seal body defining an interior area, and wherein at least one inertial damping element of the first and second inertial damping elements is disposed within the interior area.

The gas turbine engine of any preceding clause, wherein the floating seal assembly comprises a seal body, and wherein the seal body comprises one or more interior areas, and wherein at least one inertial damping element of the first and second inertial damping elements comprises one or more frictional dampening elements disposed within the one or more interior areas.

The gas turbine engine of any preceding clause, wherein the floating seal assembly comprises at least one of a floating radial seal assembly or a floating face seal assembly.

A gas turbine engine comprising: a compressor section and a turbine section in axial flow arrangement defining an axially extending, longitudinal centerline, and arranged as a rotor and a stator; and a floating seal assembly, sealing at least portions of the rotor and the stator relative to a first pressure area and a second pressure area, the first pressure area pressurized greater than the second pressure area, the floating seal assembly comprising one or more inertial damping elements, the one or more inertial damping elements damping vibrations in at least one of an axial direction, a radial direction, or a circumferential direction at one or more frequencies.

The gas turbine engine of any preceding clause, wherein at least one inertial damping element of the one or more inertial damping elements comprises: one or more tubes oriented in at least one of the axial direction, the radial direction, or the circumferential direction; and a fluid disposed within the one or more tubes.

A floating seal assembly for sealing an interface between a rotating component and a stationary component of a gas turbine engine, the floating seal assembly comprising: a seal body comprising one or more seal faces configured to define one or more seals between the rotating component and the stationary component; and one or more inertial damping elements coupled to the seal body and tuned to one or more frequencies.

The floating seal assembly of any preceding clause, wherein at least one inertial damping element of the one or more inertial damping elements contains a fluid.

The floating seal assembly of any preceding clause, wherein at least one inertial damping element of the one or more inertial damping elements is positioned within an interior area of the seal body.

The floating seal assembly of any preceding clause, wherein the one or more inertial damping elements comprises a first inertial damping element tuned to a first frequency and a second inertial damping element tuned to a second frequency, the second frequency different than the first frequency.

The floating seal assembly of any preceding clause, wherein at least one inertial damping element of the one or more inertial damping elements comprises: one or more mass elements; and one or more compliance elements coupling the one or more mass elements to the seal body.

The floating seal assembly of any preceding clause, wherein the seal body comprises one or more interior areas, and wherein at least one inertial damping element of the one or more inertial damping elements comprises one or more frictional dampening elements disposed within the one or more interior areas.

The floating seal assembly of any preceding clause, wherein the one or more inertial damping elements comprises a first inertial damping element tuned to a first frequency and a second inertial damping element tuned to a second frequency, the second frequency different than the first frequency.

The floating seal assembly of any preceding clause, wherein the one or more inertial damping elements comprises a first inertial damping element tuned to a first G load and a second inertial damping element tuned to a second G load, the second G load different than the first G load.

The floating seal assembly of any preceding clause, wherein the floating seal assembly comprises at least one of a floating radial seal assembly or a floating face seal assembly.

We claim:

1. A gas turbine engine comprising:

a compressor section and a turbine section in axial flow arrangement defining an axially extending, longitudinal centerline, and arranged as a rotor and a stator; and a floating seal assembly disposed at an interface of the rotor and the stator, the floating seal assembly comprising one or more inertial damping elements tuned to one or more frequencies, wherein at least one inertial damping element of the one or more inertial damping elements comprises:

one or more tubes, wherein the one or more tubes the one or more tubes comprising a plurality of tube segments, wherein at least one of the plurality of tube segments extends perpendicularly to the floating seal assembly; and a fluid disposed within the one or more tubes.

2. The gas turbine engine of claim 1, wherein the floating seal assembly comprises a seal body, and wherein at least one of the one or more tubes is positioned within an interior area of the seal body.

3. The gas turbine engine of claim 1, wherein the floating seal assembly comprises a seal body, and wherein at least one of the one or more tubes s is coupled to an exterior surface of the seal body.

4. The gas turbine engine of claim 1, wherein at least one of the one or more tubes are oriented in at least one of an axial direction, a radial direction, or a circumferential direction.

5. The gas turbine engine of claim 1, wherein the floating seal assembly comprises at least one of a floating radial seal assembly or a floating face seal assembly.

6. The gas turbine engine of claim 1, wherein the floating seal assembly comprises at lease one of the one or more tubes tuned to a first frequency and a second inertial damping element tuned to a second frequency, the second frequency different than the first frequency.

7. The gas turbine engine of claim 1, wherein the one or more tubes damping vibrations of the floating seal assembly in at least one of an axial direction, a radial direction, or a circumferential direction at one or more frequencies.

8. A gas turbine engine comprising:

a compressor section and a turbine section in axial flow arrangement defining an axially extending, longitudinal centerline, and arranged as a rotor and a stator; and a floating seal assembly disposed at an interface of the rotor and the stator, the floating seal assembly comprising one or more inertial damping elements tuned to one or more frequencies, wherein the floating seal assembly comprises a seal body, and wherein at least one inertial damping element of the one or more inertial damping elements comprises:

one or more mass elements; and one or more compliance elements coupling the one or more mass elements to an exterior surface the seal body.

9. The gas turbine engine of claim 8, wherein the floating seal assembly comprises at least one of a floating radial seal assembly or a floating face seal assembly.

10. The gas turbine engine of claim 8, wherein the floating seal assembly comprises one or more mass element tuned to a first frequency and a second inertial damping element tuned to a second frequency, the second frequency different than the first frequency.

11. The gas turbine engine of claim 8, wherein the one or more mass element damping vibrations of the floating seal assembly in at least one of an axial direction, a radial direction, or a circumferential direction at one or more frequencies.

12. A gas turbine engine comprising:

a compressor section and a turbine section in axial flow arrangement defining an axially extending, longitudinal centerline, and arranged as a rotor and a stator; and a floating seal assembly disposed at an interface of the rotor and the stator, the floating seal assembly comprising one or more inertial damping elements tuned to one or more frequencies, wherein the floating seal assembly comprises a seal body having one or more interior areas, and wherein at least one inertial damping element of the one or more inertial damping elements comprise one or more frictional dampening elements disposed within the one or more interior areas.

13. The gas turbine engine of claim 12, wherein the one or more frictional dampening elements comprise unconsolidated powder.

14. The gas turbine engine of claim 13, wherein the floating seal assembly comprises a seal body, and wherein the one or more floating dampening elements is positioned within an interior area of the seal body.

15. The gas turbine engine of claim 13, wherein the floating seal assembly comprises at least one of a floating radial seal assembly or a floating face seal assembly.

16. The gas turbine engine of claim 13, wherein the floating seal assembly comprises the one or more frictional dampening elements tuned to a first frequency and a second inertial damping element tuned to a second frequency, the second frequency different than the first frequency.

17. The gas turbine engine of claim 13, wherein the one or more inertial damping elements damping vibrations of the floating seal assembly in at least one of an axial direction, a radial direction, or a circumferential direction at one or more frequencies.

* * * * *